July 29, 1969  R. S. OWENS ETAL  3,458,260
APPARATUS AND METHOD FOR DETERMINING THE
EFFECTIVENESS OF MIXING OF LIQUIDS
Filed Dec. 7, 1964
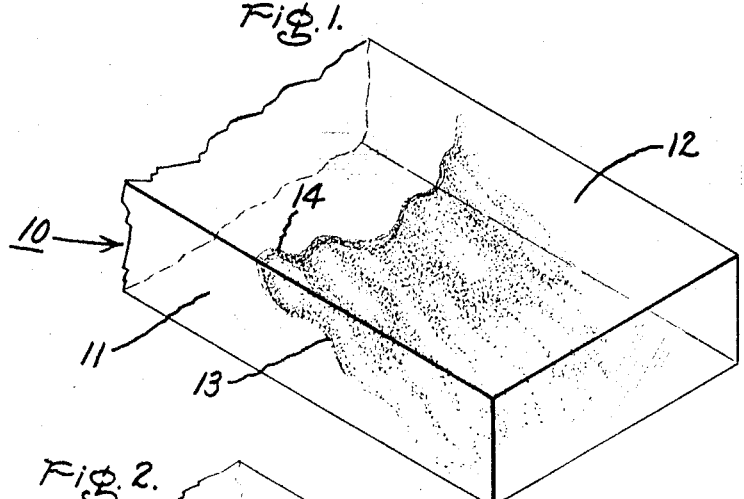
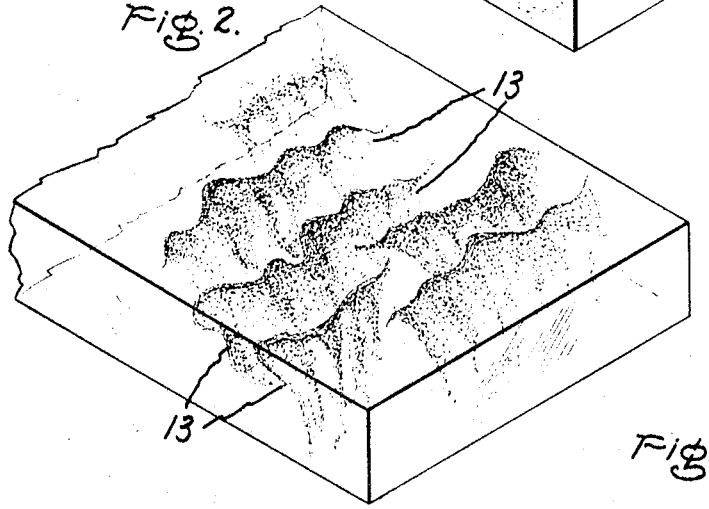
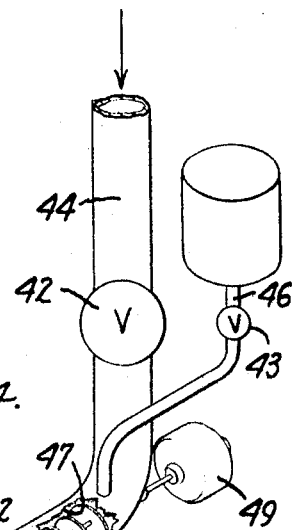
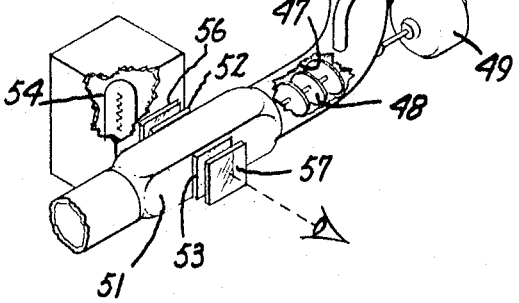
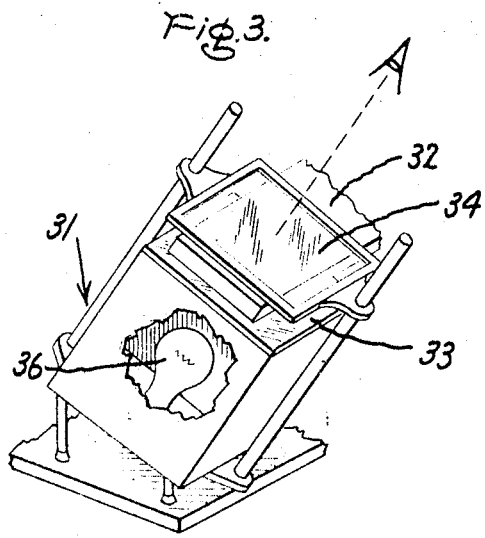
Inventors:
Robert S. Owens,
Wilson J. Barnes,
by Leo I. MaLossi
Their Attorney.

United States Patent Office 3,458,260
Patented July 29, 1969

3,458,260
APPARATUS AND METHOD FOR DETERMINING THE EFFECTIVENESS OF MIXING OF LIQUIDS
Robert S. Owens, Latham, and Wilson J. Barnes, Schenectady, N.Y., assignors to General Electric Company, a corporation of New York
Filed Dec. 7, 1964, Ser. No. 416,231
Int. Cl. G01h 21/40
U.S. Cl. 356—115                                4 Claims

ABSTRACT OF THE DISCLOSURE

Both apparatus and method for determining the effectiveness of a multi-component liquid mixing operation are described. Liquid components productive of a material, which has the quality of exhibiting birefringence in the cured state under the application of stress, are mixed in the given operation and then viewed (either in the liquid state or in the cured state) in unstressed condition under polarized light. When so examined, zones in which the liquid components have been improperly mixed exhibit birefringence, while the properly mixed zones do not. Thus, the presence of birefringence is indicative of the need for more effective mixing action. Liquid components productive of higher molecular weight polyurethane are particularly useful in the practice of the method of this invention.

---

This invention relates to a method for determining the completeness with which liquids being combined to effect the polymerization thereof are being mixed in a particular mixing apparatus and more particularly to the use of a birefringent material (i.e. one having the property of resolving the light which falls upon its surface at normal incidence into two components and transmitting these components at different velocities on planes at right angles to each other) for this purpose.

In the mixing of freshly catalyzed systems for the production of polymers or copolymers the industry apparently has never developed a reliable technique for determining the effectiveness of the mixing of liquid components provided during passage through any given mixing head. Although it has always been desirable to accomplish thorough mixing of these liquid components there have been few instances in which the failure to produce good mixing has been recognized as responsible for substandard polymers, because the uses to which the polymers have been applied have not heretofore focused attention upon defects resulting from an incomplete mixing action.

However, it now has been found that evaluation of the effectiveness of the action in mixing liquid components in the production of higher molecular weight materials is critically important in the preparation of such materials used to encapsulate component systems in sonar installations. Thus, in the preparation of polyurethane materials (which are well-known) to be used for sonar encapsulation one practice is to mix (a) a liquid prepolymer of polyurethane resin comprising primarily toluene diisocyanate that has been reacted with a polyol, i.e. a glycol, but having an excess of toluene diisocyanate and (b) a liquid hardener containing castor oil with a polyol structure together with a small amount of a diamine structure. After properly mixing these components and pouring the mixed material in the appropriate molds, the resulting higher molecular weight polyurethane resulting from further polymerization is cured either at room temperature or under heat depending on the catalyst system present in the resin. Mixing of the liquid components can be effected either by batch mixing or by the use of a commercial mixing head in a high speed, in-line process.

When the higher molecular weight polyurethane is prepared by mixing in the batch process, the polymer so prepared does not interfere with either the reception of, or the transmission of, sound waves. However, when the polyurethane for construction of the encapsulating structure was prepared using a commercial mixing head (even though all other variables remained the same as in the batch process) the polyurethane produced was found to seriously interfere with the transmission and reception of sonar signals.

Close examination of the polyurethane product the initial liquid components of which had been mixed in the commercial mixing head disclosed that this material appeared to have striations visible on the surface thereof. Otherwise the properly mixed (batch mixed) and improperly mixed (using mixing head) polyurethane appeared indistinguishable from each other in color or in other characteristics. However, it was found unexpectedly that when a body of cured improperly mixed polyurethane is exposed to polarized light a pattern of waves and swirls are visible within the body of material caused by the internal reflection of light from plane and curved surfaces therein. A body of cured unstressed polyurethane which has been properly mixed, on the other hand, shows no internal reflecting surfaces, when viewed under polarized light. This same body of polyurethane will, of course, when viewed under polarizing conditions, display stress patterns in response to the application of various stresses thereto. Also, it was determined that many of the aforementioned surface-visible striations were the traces produced along the outer surface of the body, where internal reflecting surfaces intersected the outer surface. The true relationship between the nonreflecting portions of the polyurethane body, the internal reflecting waves and swirls and their surface traces could then be determined. It was found that the non-reflecting portions consisted of properly mixed polyurethane, the internal rececting surfaces were actually zones of improperly mixed liquid components (semi-liquid/solid material) and the surface traces resulted from differential shrinkage between properly and improperly mixed material.

This did not, however, account for all the surface striations and further examination disclosed that surface striations could be due to either or both of two distinct factors: (a) surface traces from the reflecting zones of semi-liquid/solid material wherein the original liquid components had not been effectively mixed and (b) flow lines or patterns, which occurred when the liquid wave fronts of completely mixed materials met. Although those striations are surface manifestations of zones of incompletely mixed materials, which penetrate deep into or even all the way through the bulk of the polyurethane, the flow line striations are only a surface phenomenon. The presence of these flow lines poses no problem with respect to sonar signal reception and transmission, while the penetrating striations (zones of unmixed material) present a serious problem in this regard and unaided visiual examination cannot distinguish between flow line striations and the striations due to incomplete mixing. Thus, this invention is particularly important as a quality control measure.

Also, it has been found that the presence of zones of improperly mixed materials can be detected, when present, under polarized light even when not visible on the surface of the body of polyurethane. Further, it was found that while the freshly-mixed materials are still in the liquid state these striations indicating zones of insufficient mixing of the liquid components can be detected by viewing the stream of liquids under polarized light. In this manner some measure of the effectiveness of the mixing of the liquid components can be provided before solidification has occurred.

When the polyurethane resin and hardener in the stream have been substantially, but not completely, mixed the presence of incompletely mixed material can be detected more easily by slowly moving the mixed liquid in the stream in the region under observation with a stirring rod during the viewing thereof under polarized light. As would be expected, when the stream of machine-mixed material in which under-mixed zones are detected is subjected to sufficient additional blending, the striations and internal reflections disappear. The reason for the freedom from zones of unmixed material in batch-mixed polyurethane is that a more thorough blending operation was employed.

It is, therefore, a prime object of this invention to provide a method for determining the effectiveness of the mixing action provided by any given mixing apparatus for blending liquid components in the process of preparing solid polymeric material.

It is another object of this invention to provide a monitor device for adjusting a mixing apparatus by determining the degree of mixing of polyurethane resin and hardener therein, while these components are still in the liquid state.

These and other objects may be realized in the practice of this invention by passing through a mixing head to be tested or adjusted liquid polyurethane resin and liquid hardener, which are combined in the mixing head to promote their interaction to form a higher molecular weight polyurethane, a material displaying pronounced birefringence when stress is applied thereto in the cured state, observing the stream of liquids so mixed under polarized light in order to detect the presence of striations therein and/or observing the cured polymeric material under polarized light to determine the presence of striations therein.

Other objects and advantages of the invention will hereinafter become more fully apparent from the following description of the annexed drawing which illustrates the operation of the invention wherein:

FIG. 1 is a schematic illustration of the manner in which a single zone of semi-liquid/solid incompletely mixed material is apt to be disposed in a cured body of polyurethane;

FIG. 2 is a schematic representation of the appearance of zones of improperly mixed materials in a body of cured polyurethane viewed under polarized light;

FIG. 3 is a schematic illustration of an arrangement by which the presence of regions of improperly mixed materials may be detected in a cured body of polyurethane with polarized light; and FIG. 4 is a schematic illustration of an arrangement by which the presence of zones of improperly mixed material may be detected in a stream of mixed liquid components in order to monitor the flows of these liquid components.

In FIG. 1 a piece of cured polyurethane the initial components of which, when in the liquid state, were combined in a mixing head unable to properly mix these components is shown. For the sake of simplicity only a single zone of improperly mixed material has been shown to better illustrate the manner in which such zones penetrate into the body of the material and may be prominent above the surface of the cured polymeric material as a striation. Thus, body 10 of polyurethane shown greatly enlarged comprises portions 11 and 12 resulting from properly mixed liquid components these portions being separated by portion 13, a surface-visible striation and penetrating zone of semi-liquid/solid material resulting from the incomplete mixing of the polyurethane resin and hardener. Projection 14 of portion 13 protrudes above the surface of the cured polyurethane 10, because during curing of the polyurethane, the shrinkage of the properly mixed material (portions 11 and 12) is greater than the shrinkage of the incompletely mixed material (portion 13). As a result the trace 14 of zone 13 seen viewing the polyurethane body 10 in plan appears as a striation. It has been found that the height of projection 14 above the surrounding surface may amount to as much as about 0.15 mils although in some instances the zone 13 may exist entirely within the body of the material and not be evident to the unaided eye.

In FIG. 2 is shown the appearance of a polyurethane sample having many zones 13 as they appear in the polyurethane body when observed under polarized light. Many swirls and waves are clearly visible within the body of polyurethane because of the internal reflection caused thereby and each of these reflecting surfaces represents a zone of poorly mixed material extending a considerable distance into the body of cured polyurethane.

Having observed the presence of such striations and zones in a polyurethane sample produced by a given mixing head, the tester is alerted to the need to change the flow parameters or the design of the mixing head to provide more effective mixing action. As appropriate changes are made in the setting of the mixing head or in the design thereof additional cured samples of polyurethane produced from polyurethane resin and hardener subsequently mixed therein are observed until the desired degree of improvement has been achieved indicated by the absence of internal reflecting zones in a cured sample thereof when viewed under polarized light.

If a given mixing head is to be used to mix resins and hardeners for the production of polymers other than polyurethane, polyurethane may still be used as the calibrating mechanism therefor, if the particular polymer is not itself birefringent. Calibration is accomplished by adjusting the viscosities and relative quantities of the calibrating liquid components (polyurethane resin and hardener) to match the viscosities and relative quantities of the liquid components for the preparation of the particular polymer to be produced with the mixing head under consideration. By producing a sample of higher molecular weight polyurethane from liquid components properly matched for viscosity and relative quantities to those of the production polymer, and viewing this sample under polarized light a practical guide is provided to simulate the degree of mixing of liquid components that can be expected with the particular production polymer for which the mixing head is to be employed. When striation-free examples of polyurethane are produced using a given mixing head, this design or adjustment should be suitable for use in producing proper mixing of other resins and hardeners having comparable viscosities and relative quantities.

The polariscope 31 for viewing a piece 32 of cured polyurethane material therein is shown schematically in FIG. 3. Polarizer 33 and analyzer 34 are arranged spaced from and parallel to each other and the polyurethane piece 32 is disposed therebetween. Light from light source 36 passes through piece 32 and both elements 33, 34. When polarizer 33 and analyzer 34 are properly oriented relative to each other stress patterns show up in piece 32 by simply applying pressure thereto because of its birefringence. This serves as a simple test to determine the proper relative orientation of polarizer 33 and analyzer 34 for analysis of sample 32 in accordance with this invention. It may be necessary to turn analyzer 34 through 90° in its established plane to secure proper orientation. This technique is well-established in connection with the stress analysis of models of structural elements formed with birefringent materials.

With polarizer 33 and analyzer 34 so oriented and piece 32 disposed therebetween, cured piece 32 (free of externally-imposed stress) will appear to be free of internal reflecting surfaces, if the liquid components thereof have been properly mixed. However, warped and wavy designs (FIG. 2) are clearly seen in piece 32, if the liquid components thereof have not been mixed sufficiently well.

In those instances in which it is desired to carry out dynamic adjustments to a mixing head or other mixing apparatus 41 an arangement such as is shown in FIG. 4 may be used. As an example, the proper adjustments of valves 42, 43 in feed pipes 44, 46, respectively, through which liquid resin (pipe 44) and liquid hardener (pipe 46) enter the mixing chamber 47 to be blended by agitator 48 driven by motor 49, may be determined. By the use of polyurethane resin and castor oil hardener (or of some other resin and hardener producing a birefringement polymer) of properly selected viscosities and concentrations so that the viscosities and volumes of the liquid materials matches those of the material to be mixed in the apparatus 41, proper adjustments applicable to its intended use may be made to control the effectiveness of the mixing action.

In order to prepare high molecular weight polyurethane free of bubbles the polyurethane resin is heated to about 85° C. and a vacuum (about 1–20 mm. of mercury) is applied thereto whereby with gentle agitation the resin can be de-gassed. This de-gassed resin is conducted through pipe 44 to mixing chamber 47 via valve 42 to be mixed with the hardener (castor oil with a polyol structure plus some material of diamine structure). When resin and hardeners are properly mixed —NH and/or —OH groups are made available in a number equal to the number of terminal —NCO groups in the prepolymerized resin and such small amount of excess toluene diisocyanate as may be present in the resin. Cross-linking then occurs in the mixed material to produce the desired higher molecular weight polyurethane. Zones of improperly mixed materials are those zones wherein an insufficient number of —NH and/or —OH groups have been provided to accommodate the —NCO groups and a material different from the desired higher molecular weight polyurethane results.

Thus, as freshly mixed polyurethane and hardener pass from mixing chamber 47 into flat sided detection chamber 51 the flow is viewed under polarized light through windows 52, 53. In the device shown, illumination from light source 54 passes through polarizer 56, window 52, the stream of newly mixed liquids, window 53 and analyzer 57 to the eye of the observer. Thereupon, adjustments are made as required to settings of valves 42, 43 or to the speed of motor 49 until reflecting surfaces no longer appear in the stream viewed under polarized light.

Therefore, in accordance with this invention a simple but effective technique has been presented whereby the capacity of a given mixing apparatus to effectively mix the liquid components of a polymer may be assessed and/or dynamic adjustments in the flow parameters of such mixing apparatus may be monitored.

Various modifications of the embodiments of the invention disclosed herein are contemplated and may be resorted to in its application by those of ordinary skill in the art without departing from the definition of this invention as recited in the appended claims.

What we claim as new and desire to secure by Letters Patent of the United States is:

1. A method for determining the effectiveness for mixing of an apparatus wherein liquid reactants are mixed to produce a plastic material of increased molecular weight comprising the steps of:
   (a) mixing liquid reactants in said apparatus to produce a material which in a cured state exhibits birefringence under the application of external stress to a cured body thereto,
   (b) exposing a quantity of the birefringent material in a substantially unstressed state to polarized light,
   (c) viewing on a macroscopic scale said quantity of unstressed material exposed to polarized light to determine the degree of freedom of said quantity of unstressed material from birefringence visible under polarized light and
   (d) changing parameters of the mixing operation effected by said apparatus to diminish the presence of such visible birefringence and thereby improve the mixing operation.

2. The method as recited in claim 1 wherein the mixing step comprises mixing polyurethane resin with castor oil containing a small amount of diamine structure whereby a higher molecular weight polyurethane, a sensitive birefringent material, is produced.

3. The method as recited in claim 2 wherein the viewing step comprises viewing the higher molecular weight polyurethane in the liquid state.

4. The method as recited in claim 2 wherein the viewing step comprises viewing the higher molecular weight polyurethane in the cured state.

References Cited

UNITED STATES PATENTS

| | | | |
|---|---|---|---|
| 2,435,953 | 2/1948 | Bennett | 350—15 |
| 3,016,789 | 1/1962 | Keston. | |
| 3,090,222 | 5/1963 | Akaboshi et al. | 73—53 |

OTHER REFERENCES

Mark, A., Physical Chemistry of High Polymeric Systems (Interscience Publishers, Inc., N.Y., 1955), pp. 60–62.

Keller, A., J. Polymer Science, (1955), V. XVII, pp. 291–308.

Mandelkern, L., Crystallization of Polymers, (McGraw-Hill, N.Y., June, 1964), pp. 326–337.

RONALD L. WIBERT, Primary Examiner

WARREN A. SKLAR, Assistant Examiner

U.S. Cl. X.R.

137—2, 93; 260—18; 356—36